(12) United States Patent
Lin et al.

(10) Patent No.: US 11,272,550 B2
(45) Date of Patent: Mar. 8, 2022

(54) NARROWBAND INTERNET OF THINGS RANDOM ACCESS CHANNEL CONFIGURATION DESIGN

(71) Applicant: Telefonaktiebolaget LM Ericsson (publ), Stockholm (SE)

(72) Inventors: Xingqin Lin, Santa Clara, CA (US); Ansuman Adhikary, Hyderabad (IN); Johan Bergman, Stockholm (SE); Yufei Blankenship, Kildeer, IL (US); Asbjörn Grövlen, Stockholm (SE); Hazhir Shokri Razaghi, Solna (SE); Yutao Sui, Solna (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/084,805

(22) PCT Filed: Mar. 16, 2017

(86) PCT No.: PCT/SE2017/050259
§ 371 (c)(1),
(2) Date: Sep. 13, 2018

(87) PCT Pub. No.: WO2017/160221
PCT Pub. Date: Sep. 21, 2017

(65) Prior Publication Data
US 2019/0075602 A1    Mar. 7, 2019

Related U.S. Application Data

(60) Provisional application No. 62/309,391, filed on Mar. 16, 2016.

(51) Int. Cl.
*H04W 74/08* (2009.01)
*H04W 72/04* (2009.01)
(Continued)

(52) U.S. Cl.
CPC ....... *H04W 74/0841* (2013.01); *H04L 5/0012* (2013.01); *H04L 5/0053* (2013.01);
(Continued)

(58) Field of Classification Search
None
See application file for complete search history.

(56) References Cited

U.S. PATENT DOCUMENTS

| 2010/0221918 A1 | 9/2010 | Takemura et al. |
| 2016/0105264 A1* | 4/2016 | Chen ...................... H04W 4/70 370/329 |

(Continued)

FOREIGN PATENT DOCUMENTS

| CN | 101841922 A | 9/2010 |
| CN | 102711273 A | 10/2012 |
| CN | 104081680 A | 10/2014 |

OTHER PUBLICATIONS

Lei et al: U.S. Appl. No. 62/309,391 specification and figures, filed Aug. 28, 2015 (Year: 2015).*

(Continued)

*Primary Examiner* — Joseph E Avellino
*Assistant Examiner* — The Hy Nguyen
(74) *Attorney, Agent, or Firm* — Christopher & Weisberg, P.A.

(57) ABSTRACT

According to one aspect of the disclosure, a wireless device is configured to transmit a random access preamble. The wireless device includes processing circuitry. The processing circuitry is configured to obtain a tone index, and determine a location within a frequency band for transmitting the random access preamble based on the obtained tone index.

23 Claims, 13 Drawing Sheets

(51) Int. Cl.
*H04L 5/00* (2006.01)
*H04W 4/80* (2018.01)
*H04W 76/27* (2018.01)
*H04L 27/26* (2006.01)

(52) U.S. Cl.
CPC .......... *H04L 27/2607* (2013.01); *H04W 4/80* (2018.02); *H04W 72/0453* (2013.01); *H04W 76/27* (2018.02)

(56) References Cited

U.S. PATENT DOCUMENTS

| | | | |
|---|---|---|---|
| 2016/0295513 A1* | 10/2016 | Moon | H04B 7/0634 |
| 2017/0041929 A1* | 2/2017 | Noh | H04L 5/0053 |
| 2017/0064743 A1* | 3/2017 | Lei | H04W 74/0833 |
| 2017/0164350 A1* | 6/2017 | Sun | H04L 5/0007 |
| 2017/0202028 A1* | 7/2017 | Gaal | H04W 74/0833 |
| 2017/0280481 A1* | 9/2017 | Stern-Berkowitz | H04W 74/0833 |
| 2017/0367003 A1* | 12/2017 | Zhang | H04W 8/08 |
| 2018/0139783 A1* | 5/2018 | Park | H04W 88/08 |
| 2018/0249509 A1* | 8/2018 | Yi | H04W 48/16 |
| 2018/0316532 A1* | 11/2018 | Tie | H04L 27/26025 |
| 2019/0068427 A1* | 2/2019 | Hwang | H04W 76/11 |
| 2019/0104549 A1* | 4/2019 | Deng | H04B 7/0617 |
| 2019/0274168 A1* | 9/2019 | Hwang | H04L 5/0012 |
| 2021/0105819 A1* | 4/2021 | Takeda | H04W 72/04 |

OTHER PUBLICATIONS

Gaal et al: U.S. Appl. No. 62/276,211 specification and figures, filed Jan. 7, 2016 (Year: 2016).*
Hwang et al: U.S. Appl. No. 62/306,600 specification and figures, filed Mar. 10, 2016 (Year: 2016).*
Wikipedia article about Resource Unit.*
International Search Report and Written Opinion dated May 30, 2017 for International Application No. PCT/SE2017/050259 filed on Mar. 16, 2017, consisting of 9-pages.
3GPP TSG-RAN1 #84 R1-160439; Title: NB-IoT—Hopping Pattern for Single Tone NB-PRACH; Source: Ericsson Document for: Discussion and decision; Agenda Item: 7.2.1.2.2; Location and Date: St. Julian's, Malta Feb. 15-19, 2016, consisting of 5-pages.
3GPP TSG-RAN WG2 Meeting NB-IOT ad-hoc R2-160470; Title: Random access for NB-IOT; Agenda Item: 6.1; Source: Ericsson; Document for: Discussion, Decision; Location and Date: Budapest, Hungary, Jan. 19-21, 2016, consisting of 6-pages.
3GPP TSG RAN1 WG1 #84 R1-161357; Title: NB-PRACH design; Source: Huawei, HiSilicon, Neul; Document for Discussion and decision; Agenda Item: 7.2.1.2.2; Location and Date: St. Julian's, Malta Feb. 15-19, 2016, consisting of 8-pages.
3GPP TSG-RAN1 NB-IOT Ad Hoc R1-160093; Title: NB-IoT—Design Considerations for Single Tone Frequency Hopped NB-PRACH; Source: Ericsson; Document for: Discussion and decision; Agenda Item: 2.1.2.2; Location and Date: Budapest, Hungary, Jan. 18-20, 2016, consisting of 7-pages.
3GPP TSG-RAN1 #84 R1-160276; Title: NB-IoT—NB-PRACH Evaluations; Source: Ericsson; Document for Discussion and decision; Agenda Item: 7.2.1.2.2; Location and Date: St. Julian's, Malta Feb. 15-19, 2016, consisting of 6-pages.
3GPP TS 36.211 V12.8.0; 3rd Generation Partnership Project; Technical Specification Group Radio Access Network; Evolved Universal Terrestrial Radio Access (E-UTRA); Physical channels and modulation (Release 12); Dec. 2015, consisting of 136-pages.
3GPP TSG-RAN 1 #82bis R1-156011; Title: Narrowband LTE—Random Access Design; Source: Ericsson; Document for: Discussion and decision; Location and Date: Malmo, Sweden, Oct. 5-10, 2015, consisting of 11-pages.
European Communication Pursuant to Article 94(3) EPC dated Jun. 16, 2020 for Application No. 17715289.9, consisting of 4-pages.
3GPP TSG RAN WG1 NB-IoT Ad-Hoc Meeting R1-161835; Title: NB-IoT-NPRACH Configurations; Agenda: 2.3.4; Source: Ericsson; Document for: Discussion and decision; Location and date: Sophia Antipolis, France, Mar. 22-24, 2016, consisting of 14-pages.
Chinese Office Action and English Translation dated Oct. 9, 2020 issued for Application No. 201780017762.4 consisting of 9-pages.
EPO Communication and European Search Report dated Jul. 12, 2021 for Patent Application No. 21171455.5, consisting of 8-pages.

* cited by examiner

NARROWBAND INTERNET OF THINGS RANDOM ACCESS CHANNEL CONFIGURATION DESIGN

CROSS-REFERENCE TO RELATED APPLICATIONS

This application is a Submission Under 35 U.S.C. § 371 for U.S. National Stage Patent Application of International Application No.: PCT/SE2017/050259, filed Mar. 16, 2017 entitled "NARROWBAND INTERNET OF THINGS RANDOM ACCESS CHANNEL CONFIGURATION DESIGN," which claims priority to U. S. Provisional Application No.: 62/309,391, filed Mar. 16, 2016, entitled "NARROWBAND INTERNET OF THINGS RANDOM ACCESS CHANNEL DESIGN," the entireties of both of which are incorporated herein by reference.

TECHNICAL FIELD

The disclosure relates to wireless communication and in particular, to narrowband random access channel configuration.

BACKGROUND

The Networked Society and Internet of Things (IoT) are associated with new requirements of cellular networks, e.g., with respect to device cost, battery lifetime and coverage. To drive down device and module cost, using a system-on-a-chip (SoC) solution with integrated power amplifier (PA) is highly desirable. However, it is feasible for the current state-of-the-art PA technology to allow 20-23 dBm transmit power when the PA is integrated to the SoC. This constraint limits uplink "coverage", which is related to how much path loss is allowed between the wireless device and base station. To maximize the coverage achievable by an integrated PA, it is necessary to reduce PA backoff. PA backoff is needed when the communication signal has non-unity peak-to-average power ratio (PAPR). The higher the PAPR, the higher the PA backoff required. Higher PA backoff also gives rise to lower PA efficiency, and thus lower device battery life time. Thus, for wireless IoT technologies, designing an uplink communication signal that has as low PAPR as possible is critically important for achieving the performance objectives concerning device cost, battery lifetime and coverage.

Currently $3^{rd}$ generation partnership project (3GPP) is standardizing Narrowband IoT (NB-IoT) technologies. There is strong support from the existing long term evolution (LTE) eco-system (vendors and operators) for evolving existing LTE specifications to include the desired NB IoT features. This is motivated by the time-to-market consideration, as an LTE based NB-IoT solution can be standardized and developed in a shorter time frame. LTE uplink however is based on single-carrier frequency-division multiple-access (SC-FDMA) modulation for the uplink data and control channels, and Zadoff-Chu signal for random access. Neither of these signals has good PAPR properties.

SUMMARY

Some embodiments advantageously provide a wireless device, network node and method for narrowband random access channel configuration.

According to one aspect of the disclosure, a wireless device is configured to transmit a random access preamble. The wireless device includes processing circuitry. The processing circuitry is configured to obtain a tone index, and determine a location within a frequency band for transmitting the random access preamble based on the obtained tone index.

According to one embodiment of this aspect, the processing circuitry is further configured to cause transmission of a random access preamble using the determined location within the frequency band. According to one embodiment of this aspect, the tone index indicates a starting point of a narrowband physical random access channel, NPRACH, within the frequency band for transmitting the random access preamble. According to one embodiment of this aspect, the obtaining of the tone index includes obtaining a plurality of tone indices. Each of the plurality of tone indices indicates a respective starting subcarrier of a narrowband physical random access channel, NPRACH, band within the frequency band. The processing circuitry is further configured to determine a coverage class, and select one of the plurality of tone indices based on the determined coverage class.

According to one embodiment of this aspect, the processing circuitry is further configured to receive system information. The obtaining of the tone index is based on the received system information. According to one embodiment of this aspect, the system information is received via radio resource control (RRC) signaling. According to one embodiment of this aspect, the tone index ranges from 0 to 36. According to one embodiment of this aspect, the tone index is based on at least one of system bandwidth, a number of tones per random access channel band and a number of random access channel bands.

According to one embodiment of this aspect, the processing circuitry is further configured to obtain at least a configuration index indicating at least one subframe at which the transmission of the random access preamble is to start. According to one embodiment of this aspect, the configuration index further indicates a cyclic prefix (CP) length. According to one embodiment of this aspect, the frequency band has a bandwidth of 180 kHz, the frequency band corresponding to a plurality of subcarriers.

According to another aspect of the disclosure, a method for a wireless device for transmitting a random access preamble is provided. A tone index is obtained. A location within a frequency band for transmitting the random access preamble is determined based on the obtained tone index.

According to one embodiment of this aspect, transmission of a random access preamble is caused using the determined location within the frequency band. According to one embodiment of this aspect, the tone index indicates a starting point of a narrowband physical random access channel, NPRACH, within the frequency band for transmitting the random access preamble. According to one embodiment of this aspect, the obtaining of the tone index includes obtaining a plurality of tone indices. Each of the plurality of tone indices indicates a respective starting subcarrier of a narrowband physical random access channel, NPRACH, band within the frequency band. A coverage class is determined. One of the plurality of tone indices is selected based on the determined coverage class.

According to one embodiment of this aspect, system information is received. The obtaining of the tone index is based on the received system information. According to one embodiment of this aspect, the system information is received via radio resource control (RRC) signaling. According to one embodiment of this aspect, the tone index ranges from 0 to 36.

According to one embodiment of this aspect, the tone index is based on at least one of system bandwidth, a number of tones per random access channel band and a number of random access channel bands. According to one embodiment of this aspect, at least a configuration index indicating at least one subframe at which the transmission of the random access preamble is to start is obtained. According to one embodiment of this aspect, the configuration index further indicates a cyclic prefix (CP) length. According to one embodiment of this aspect, the frequency band has a bandwidth of 180 kHz, the frequency band corresponding to a plurality of subcarriers.

According to another aspect of the disclosure, the network node configured to receive a random access preamble from a wireless device is provided. The network node includes processing circuitry. The processing circuitry is configured to transmit an indication of a configuration to the wireless device, and receive the random access preamble according to the indicated configuration. The configuration indicates a location within a time-frequency grid that the wireless device is to use to transmit the random access preamble.

According to one embodiment of this aspect, the indication of the location within a time-frequency grid is based on a tone index. The indication of the location includes an indication of a location within a frequency band for starting transmission of the random access preamble. According to one embodiment of this aspect, the random access preamble corresponds to a frequency hopping random access preamble over a plurality of subcarriers. According to one embodiment of this aspect, the indication of the location within a time-frequency grid includes an indication of at least one subframe at which the transmission of the random access preamble is to start.

According to another aspect of the disclosure, a method for the network node for receiving a random access preamble from a wireless device is provided. An indication of a configuration is transmitted to the wireless device. The configuration indicates a location within a time-frequency grid that the wireless device is to use to transmit the random access preamble. The random access preamble according to the indicated configuration is received.

According to one embodiment of this aspect, the indication of the location within a time-frequency grid is based on a tone index. The indication of the location includes an indication of a location within a frequency band for starting transmission of the random access preamble. According to one embodiment of this aspect, the random access preamble corresponds to a frequency hopping random access preamble over a plurality of subcarriers. According to one embodiment of this aspect, the indication of the location within a time-frequency grid includes an indication of at least one subframe at which the transmission of the random access preamble is to start.

According to another aspect of the disclosure, a wireless device is configured to transmit a random access preamble. The wireless device includes a determination module configured to obtain a tone index, and determine a location within a frequency band for transmitting the random access preamble based on the obtained tone index.

According to another aspect of the disclosure, a network node configured to receive a random access preamble from a wireless device. The network node includes configuration module configured to: transmit an indication of a configuration to the wireless device. The configuration indicates a location within a time-frequency grid that the wireless device is to use to transmit the random access preamble. The configuration module is further configured to receive the random access preamble according to the indicated configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
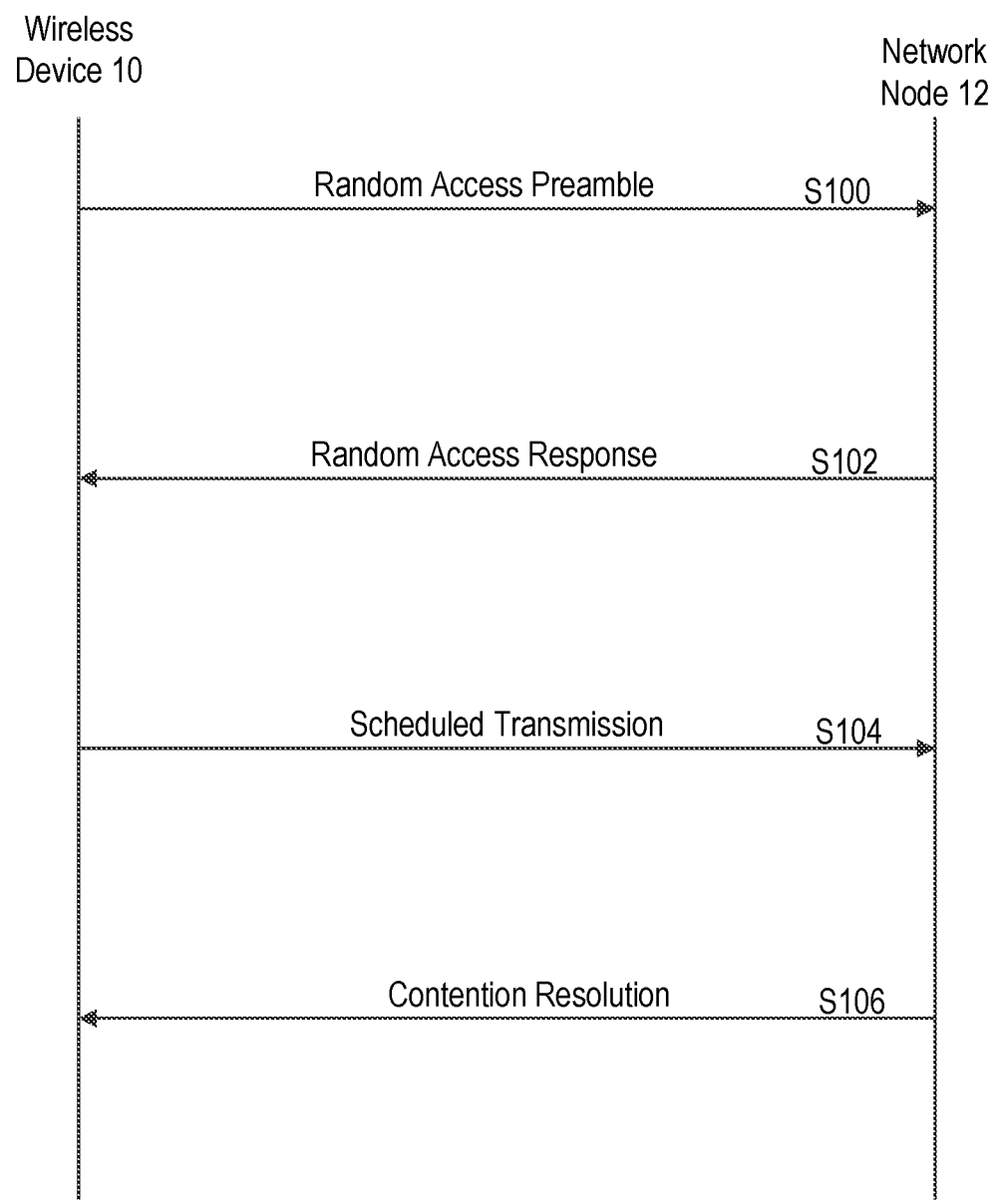
FIG. 1 is an LTE contention-based random access procedure.

Before describing in detail exemplary embodiments, it is noted that the embodiments reside primarily in combinations of apparatus components and processing steps related to configuring a narrowband random access channel for narrowband Internet of things (NB-IoT). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One or more embodiments of the disclosure provide a single tone frequency hopping NB-IoT physical random access channel (NPRACH) design in 3GPP. The NPRACH signal is a single tone and has extremely low PAPR, and thus reduces the need for PA backoff and maximizes PA efficiency. The NPRACH signal is compatible with SC-FDMA and orthogonal frequency-division multiple-access (OFDMA) as in any OFDM symbol interval, the new NPRACH signal looks like an OFDM signal of one single subcarrier.

To support a random access design, the network node described herein is configured to be able to configure the following parameters for single tone NPRACH:

Time resource information, i.e., time domain characteristic(s), that informs wireless devices "when to send;" and Frequency resource information, i.e., frequency domain characteristic(s), that directs wireless devices "where to send."

One solution could be to reuse LTE design. However, due to the dramatic differences in the PRACH design between LTE and NB-IoT, existing LTE random access channel configuration design does not apply to NB-IoT.

Some embodiments described herein advantageously provide a design framework for random access channel configuration (RACH) configuration in NB-IoT. The design framework support flexible configuration of time and frequency resources for NPRACH opportunities of different coverage classes. In general, each coverage class corresponds to a respective maximum coupling loss (MCL), wherein MCL is the maximum total channel loss between the wireless device and the network node antenna ports at which the data service can still be delivered or provided. The higher the MCL, the more robust the channel. In particular, the design framework includes at least some or all of the following aspects:

Definition of basic NPRACH formats for RACH configuration;

Definition of NPRACH band concept for RACH configuration;

Flexible configuration of one or more NPRACH bands in frequency domain signaled via system information;

Implicit or explicit mapping from coverage classes to NPRACH bands; and/or

Built on NPRACH basic formats, a table design in physical layer specifying supported RACH resource configuration in time domain.

The single tone frequency hopping NPRACH design in NB-IoT may mandate a new design for RACH configuration, which the design framework for RACH configuration described herein provides. The RACH configuration for NB-IoT described herein includes the following advantages:

Supports flexible multiplexing of NPRACH opportunities of different coverage classes, including time-division multiplexing, frequency-division multiplexing, and a mix of time-division multiplexing and frequency-division multiplexing;

Supports a large range of NPRACH opportunity densities, enabled by flexible configuration of time and frequency resources for NPRACH opportunities;

Supports RACH configuration of NPRACH of different formats with different cyclic prefixes and/or different number of symbol groups; and/or Provides reduced signaling overhead in system information with a table design in physical layer that specifies allowed NPRACH opportunities in time domain.

In the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different wireless devices in an OFDMA or SC-FDMA system, the time of arrival of each wireless device's signal needs to be within the cyclic prefix (CP) of the OFDMA or SC-FDMA signal at the network node.

LTE random access can be either contention-based or contention-free. FIG. 1 is a signaling diagram of a contention-based random access procedure including wireless device 10 and network node 12. Wireless device 10 includes hardware and/or software for performing the processes described herein. Also, network node 12 includes hardware and/or software for performing the processes described herein. Wireless device 10 transmits a random access preamble to network node 12 (Block S100). Network node 12 transmits a random access preamble response to wireless device 10 (Block S102). Wireless device 10 transmits a scheduled transmission to network node 12 (Block S104). Network node 12 transmits contention resolution signaling and/or message(s) to wireless device 10 (Block S106). Note that only Block S100 involves physical-layer processing specifically designed for random access, while Blocks S102-S106 follow the same physical-layer processing used in uplink and downlink data transmission. For contention-free random access, wireless device 10 uses reserved preambles assigned by the base station. In this case, contention resolution is not needed, and thus only Blocks S100 and S102 are required.

Figure 2:
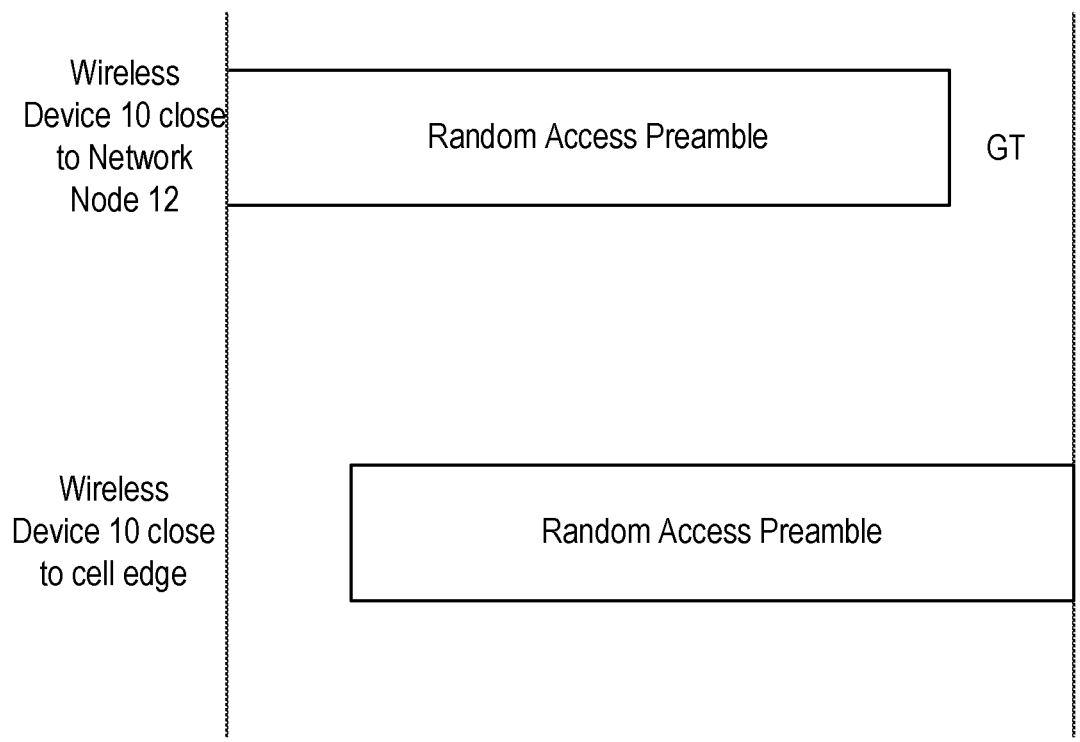
FIG. 2 is a block diagram of the random access preamble sequence sent by the wireless device.

NB-IoT PRACH serves similar purposes as in LTE, and reuses the random access procedure in LTE. As shown in FIG. 1, in Block S100, a PRACH preamble sequence is sent by wireless device 10 during a random access time segment illustrated in FIG. 2. In particular, FIG. 2 is a block diagram of the random access preamble sequence sent by wireless device 10. Wireless device 10, as used herein, may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. The PRACH preamble sequence does not occupy the entire random access segment, leaving some time as guard time (GT). As discussed earlier, to maximize PA efficiency and coverage, it is desirable to have PRACH preambles as close to constant-envelope as possible. Also, the PRACH preambles should be designed such that accurate time-of-arrival estimation can be performed by the network nodes 12, e.g., base stations. In the below description, PRACH signal and PRACH preamble are used interchangeably.

Figure 3:
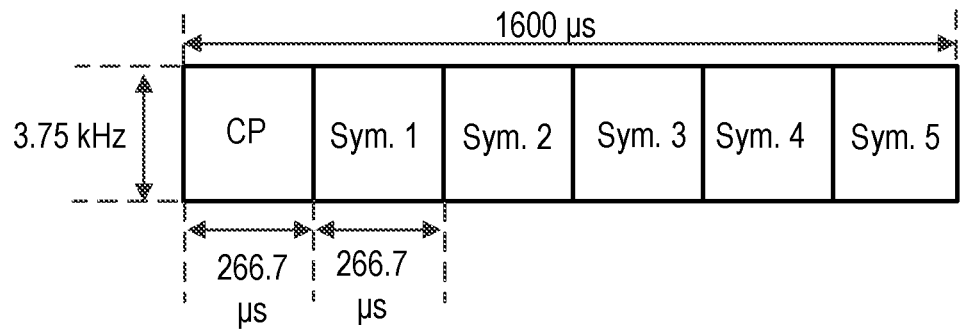
FIG. 3 is a block diagram of one example of the basic structure of a PRACH symbol group.

FIG. 3 is a block diagram of one example of the basic structure of a PRACH symbol group. The PRACH symbol group illustrated in FIG. 3 is a single tone OFDM signal. Unlike traditional OFDM symbols where a non-Cyclic prefix (CP) part consists of a single symbol, the non-CP part of the PRACH symbol group may consist of one or more symbols. One CP (of length either 266.7 microseconds (us) or 66.7 us) and 5 symbols constitute a basic symbol group. The CP lengths of 66.7 us and 266.7 us provide support for different cell sizes. The symbol structure with 266.7 us CP and 5 symbols is illustrated in FIG. 3. In one or more embodiments, for CP length of 66.7 us, a group is defined as 5 symbols and one CP of length 66.7 us.

Figure 4:
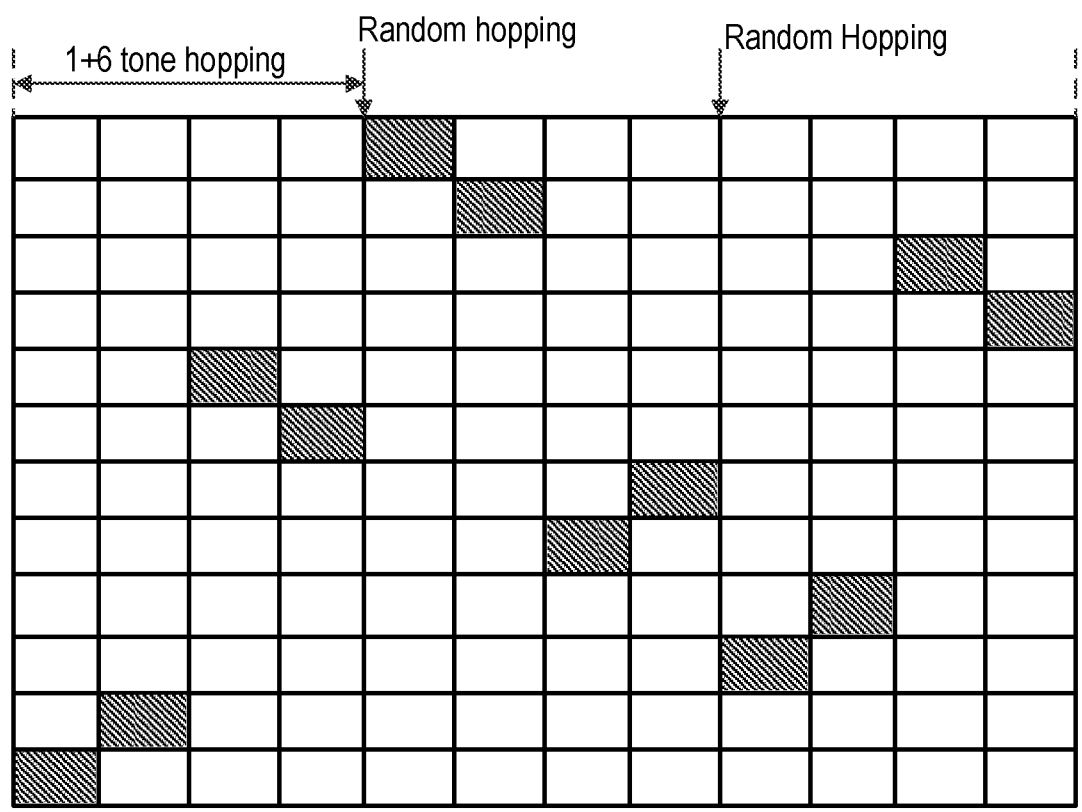
FIG. 4 is a block diagram of several hopping patterns.

A number of OFDM symbol groups, each one as illustrated in FIG. 3, are concatenated to form a PRACH preamble. But the frequency positions of the symbol groups of the same PRACH preamble vary according to one or more hopping patterns. FIG. 4 is a block diagram of several hopping patterns where each hatching indicates a time-frequency position of a symbol group whose structure is illustrated in FIG. 3.

Figure 5:
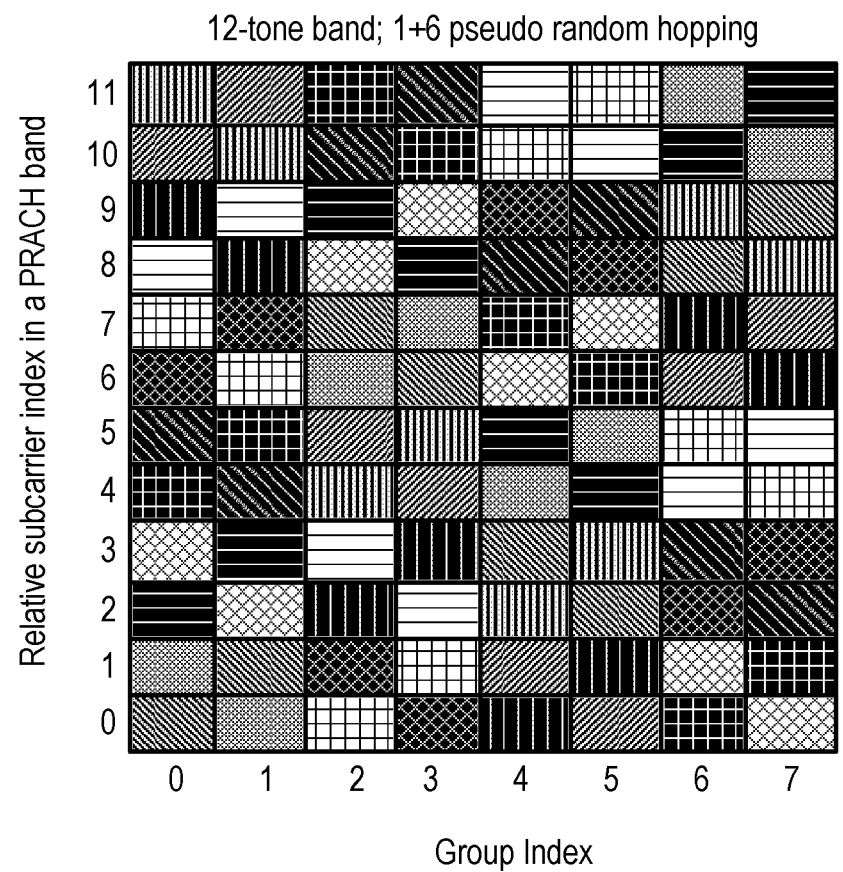
FIG. 5 is a block diagram of a time-frequency grid.

Based on the single-tone frequency hopping NPRACH, 12 tones (of bandwidth 3.75 kHz*12=45 kHz) can be used as the basic frequency resource band (like 6 PRBs in LTE PRACH) for the configuration design, with the 12 tones distributed by frequency hopping as shown in FIG. 5. In one or more embodiments, NPRACH uses a subcarrier spacing of 3.75 kHz. FIG. 5 is a block diagram of a time-frequency grid where rectangles of like hatchings belong to the same preamble. One or more positions in the time-frequency grid of FIG. 5 may be designated in system information block (SIB) or master information block (MIB) transmitted by a network node to inform a wireless device where to transmit a random access preamble. Network node 12 may transmit at least one of a tone index and a configuration index at which the random access preamble is to be transmitted, in which the tone index indicates a starting point of a NPRACH band within the frequency band for transmitting the random access preamble, and the configuration index indicates at least one subframe in the time domain at which the transmission of the random access preamble is to start, thereby providing a location within a time-frequency grid, i.e., a time-frequency location, to start transmission of the random access preamble. In one or more embodiments, the tone index is a value such as a value from 0-48 that corresponds to a tone where the NPRACH band starts. In one or more embodiments, the configuration index is a value such as a subframe number of a subframe in the time domain.

Figure 6:
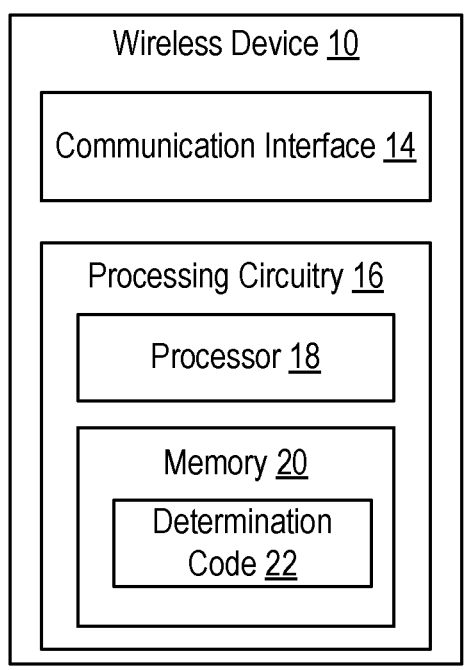
FIG. 6 is a block diagram of an exemplary wireless device in accordance with the principles of the disclosure.

FIG. 6 is a block diagram of a wireless device 10 in accordance with the principles of the disclosure. Wireless device 10 includes a communication interface 14 that is configured to communicate with a network node via one or more communication protocols such as NB-IoT based protocols via one or more communication networks. For example, in one or more embodiments, communication interface 14 is configured to transmit a random access preamble in a communication network. In one or more embodiments, communication interface 14 includes or is replaced by one or more transmitters and/or one or more receivers.

Wireless device 10 includes processing circuitry 16. Processing circuitry 16 includes processor 18 and memory 20. In addition to a traditional processor and memory, processing circuitry 16 may comprise integrated circuitry for processing and/or control, e.g., one or more processors and/or processor cores and/or FPGAs (Field Programmable Gate Array) and/or ASICs (Application Specific Integrated Circuitry). Processor 18 may be configured to access (e.g., write to and/or reading from) memory 20, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 20 may be configured to store code executable by processor 18 and/or other data, e.g., data pertaining to communication, e.g., configuration and/or address data of nodes, etc.

Processing circuitry 16 may be configured to control any of the methods and/or processes described herein and/or to cause such methods and/or processes to be performed, e.g., by wireless device 10. Corresponding instructions may be stored in the memory 20, which may be readable and/or readably connected to processor 18. Processor 18 corresponds to one or more processors 18 for performing wireless device 10 functions described herein. Wireless device 10 includes memory 20 that is configured to store data, programmatic software code and/or other information described herein. Memory 20 is configured to store determination code 22. For example, determination code 22 includes instructions that, when executed by processor 18, causes processor 18 to perform the process discussed in detail with respect to FIG. 7. In one or more embodiments, memory 20 stores one or more configurations described herein such as storing Table 2 described below. In one or more embodiments, functions described herein with respect to wireless device 10 are performed in a distributed manner among several wireless devices 10 and/or network nodes such as in a network cloud.

Figure 7:
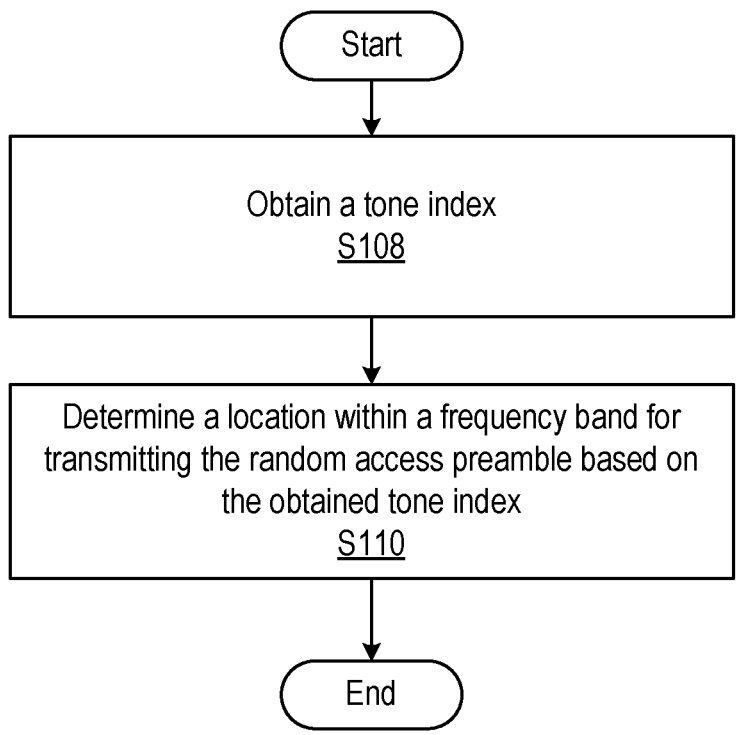
FIG. 7 is a flow diagram of an exemplary indication process of indication code in accordance with the principles of the disclosure.

FIG. 7 illustrates a flow diagram of an exemplary determination process of determination code 22 of wireless device 10 in accordance with the principles of the disclosure. The indication process determines a NPRACH configuration for transmission. Processing circuitry 16 is configured to obtain a tone index, as described herein (Block S108). In one or more embodiments, the tone index ranges from 0 to 36. In one or more embodiments, the tone index is based on at least one of system bandwidth, a number of tones per random access channel band and a number of random access channel bands. In one or more embodiments, the system bandwidth is a bandwidth of the frequency band. In one or more embodiments, the random access channel band is the NPRACH band such that the tone index is configured based on the number of NPRACH bands. In one or more embodiments, the random access channel band is the NPRACH band such that the tone index configured based the number of tones per NPRACH band. In other words, the tone index for use by wireless device 10 and configured by network node 12 is based on one or more of these above factors.

The tone index indicates a starting subcarrier of the NPRACH band. In one or more embodiments, multiple tone indices are obtained where each tone index indicates a staring subcarrier of a respective NPRACH band. In other words, the tone index indicates a starting point of a NPRACH band with in the frequency band for transmitting the random access preamble. In one or more embodiments, during transmission of the random access preamble, the frequency is changed such as by frequency hopping, described herein. The frequency band corresponds to the number of subcarriers. For example, in one embodiment, the frequency band, i.e., system bandwidth, corresponds to 48 subcarriers, i.e., 180 kHz. In one or more embodiments, the obtained tone index is obtained via system information such as system information block type 2 (SIB2) and/or master information, which are broadcast, i.e., are not signaling specific to one wireless device 10.

Processing circuitry 16 is configured to determine a location within a frequency band for transmitting, i.e., to start transmitting, the random access preamble based on the obtained tone index, as described herein (Block S110). In one or more embodiments, processing circuitry 16 is further configured to cause transmission of a random access preamble using the determined location within the frequency band. In one or more embodiments, processing circuitry is configured to transmit the random access preamble using the at least one frequency domain characteristic, e.g., location, of the RACH frequency band.

Figure 8:
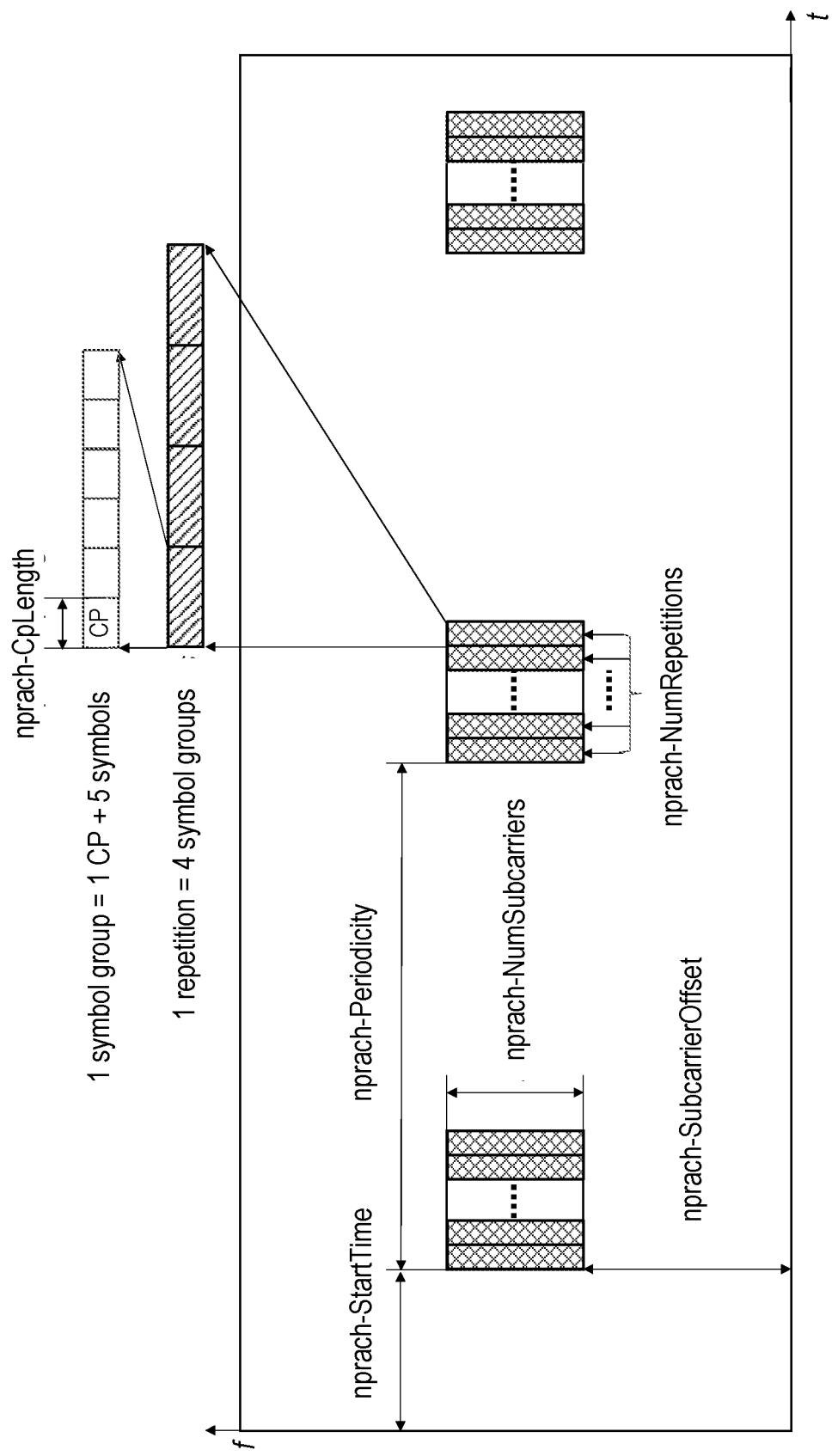
FIG. 8 is a block diagram of an exemplary NPRACH resource configuration and format information for configuring the NPRACH in accordance with the principles of the disclosure.

FIG. 8 illustrates is a block diagram of an exemplary NPRACH resource configuration and format information for configuring the NPRACH in accordance with the principles of the disclosure. In particular, the resource configuration and format information are mapped to the time-frequency grid to illustrate how these individual parameters are used to configure the NPRACH in the time-frequency grid. These parameters include NPRACH resource configuration information such as one or more of NPRACH-StartTime, NPRACH-Periodicity, NPRACH-SubcarrierOffset, NPRACH-NumSubcarriers. In one or more embodiments, NPRACH-Subcarrier Offset indicates the starting of the NPRACH band. NPRACH-Subcarrier Offset is a high communication layer parameter. In or more embodiments, NPRACH-Subcarrier Offset is a starting position of a band such as a band corresponding to 48 tones. In one example with 48 tones, the NPRACH-Subcarrier Offset is 0 since one NB-IoT carrier has at most 48 tones.

These parameters also include NPRACH format information such as one or more of NPRACH-CpLength and NPRACH-NumRepetitions. In one or more embodiments, a NPRACH time unit in time is four symbol groups where the NPRACH-NumRepetitions is defined with respect to this time unit, and the duration of NPRACH transmission is equal to NPRACH-NumReptitions*the time unit. In one or more embodiments, the NPRACH band is a twelve tone band in which the parameter NPRACH-NumSubcarriers=x*12-tone, where x=1, 2, 3 or 4. In one or more embodiments, NPRACH-NumRepetitions includes— 11, 2, 4, 8, 16, 32, 64 and 1281.

Continuing the 48 tone NPRACH band example, $N_{sc}^{RA}=12$ sub-carriers is a Layer 1 frequency hopping notation that is used in frequency hopping formula to restrict the hopping to 12 tones. Therefore, in one example, if wireless device 10 randomly selects a tone, in which:
  if the selected tone is 0-11, the hopping is within the first 12 tones; and
  if the selected tone is 12-23, the hopping within the second 12 tones;
  etc.
In other words, wireless device 10 randomly picks up one 12-tone band (0-11, 12-23, 24-35 or 36-47) from the 48-tone band. In one or more embodiments, the random access preamble is transmitted on at least two subcarriers according to the frequency hopping described herein.

As discussed herein, it is desirable to allow the networks to have the flexibility to configure 1, 2, or 3 NPRACH bands. The starting tone index of the 12-tone NPRACH bands may range from 0, . . . , 36. Nevertheless, it may be sufficient to restrict the possible starting tone index of a 12-tone NPRACH band to a subset of these values.

Figure 9:
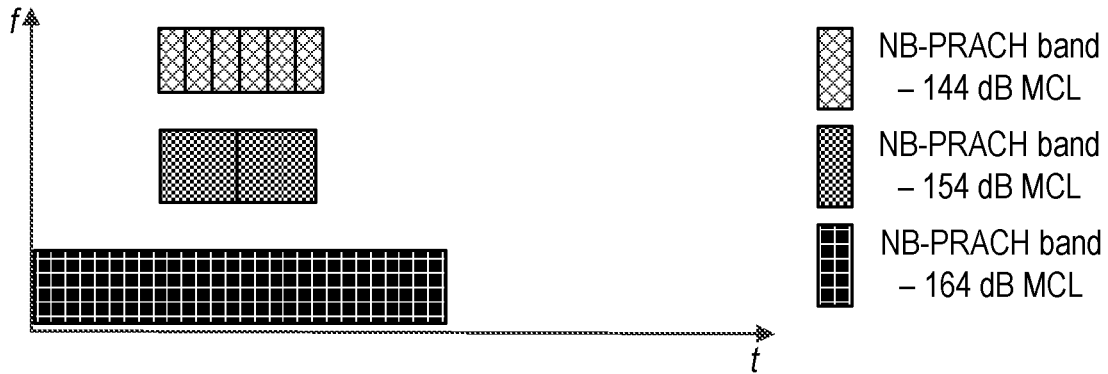
FIGS. 9-11 are block diagrams of NPRACH of different coverage classes such as FDM, TDM, and a mix of FDM and TDM in accordance with the principles of the disclosure.
Figure 10:
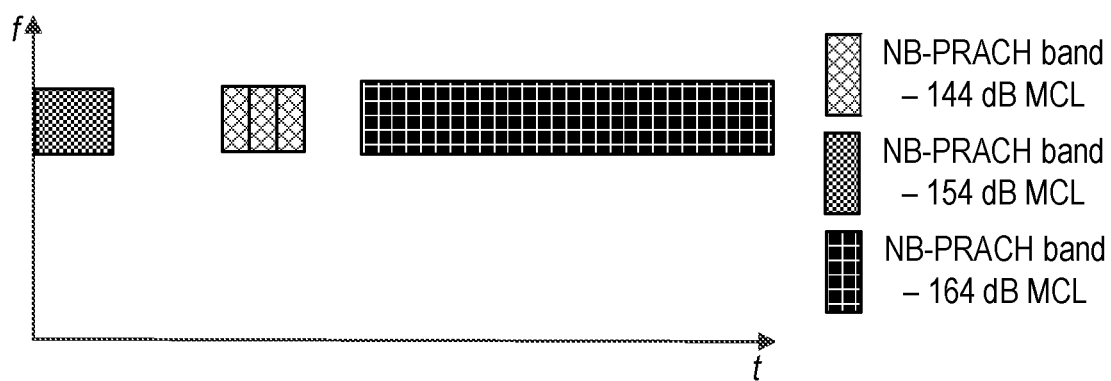
Figure 11:
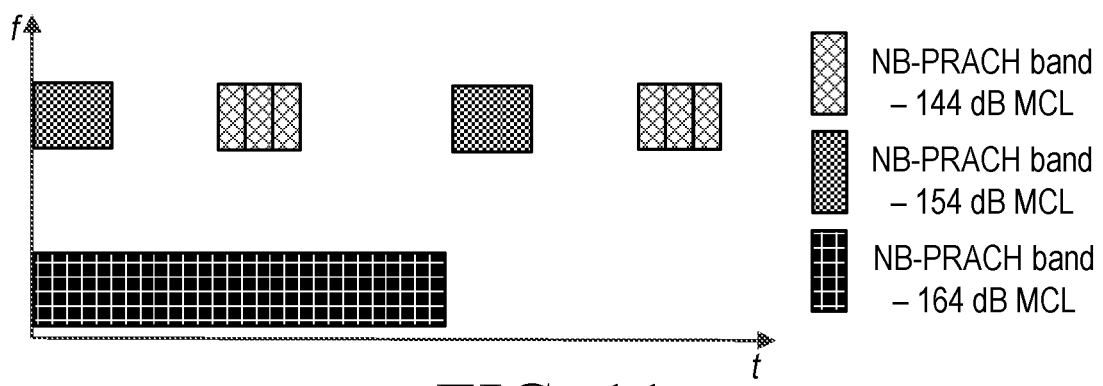

Due to the flexible deployment scenarios of NB-IoT, the instant disclosure advantageously provides the networks with flexible configuration capability when configuring radio resources for NPRACH of different coverage classes, as illustrated in FIGS. 9-11. FIGS. 9-11 illustrate block diagrams of NPRACH multiplexing of different coverage classes, where the multiplexing may include FDM, TDM, and a mix of FDM and TDM. In particular, different NPRACH bands can be configured in different parts of the time-frequency grid as illustrated in FIGS. 9-11. As discussed herein, in one or more embodiments, each NPRACH band corresponds to a different coverage class. For example, in one or more embodiments, coverage class one may correspond to NPRACH-144 dB maximum coupling loss (MCL), coverage class two may correspond to NPRACH-154 dB MCL, and coverage class three may correspond to NPRACH-164 dB MCL. The frequency division multiplex (FDM) configuration allows a separation of NPRACH of different coverage classes in the frequency domain. This kind of configuration may be easier for the network to configure and manage. The time domain division (TDM) configuration separates NPRACH of different coverage classes in the time domain. This kind of configuration is desirable if the network uses different frequency resources for NPRACH in neighboring cells. Configuration and management however are needed to mitigate blocking and/or collision of NPRACH transmissions in different coverage classes. The mix of FDM and TDM approach is a tradeoff between FDM and TDM, and can be beneficial. Furthermore, the networks should have some flexibility to configure the position of each 12-tone NPRACH band in the frequency domain.

Figure 12:
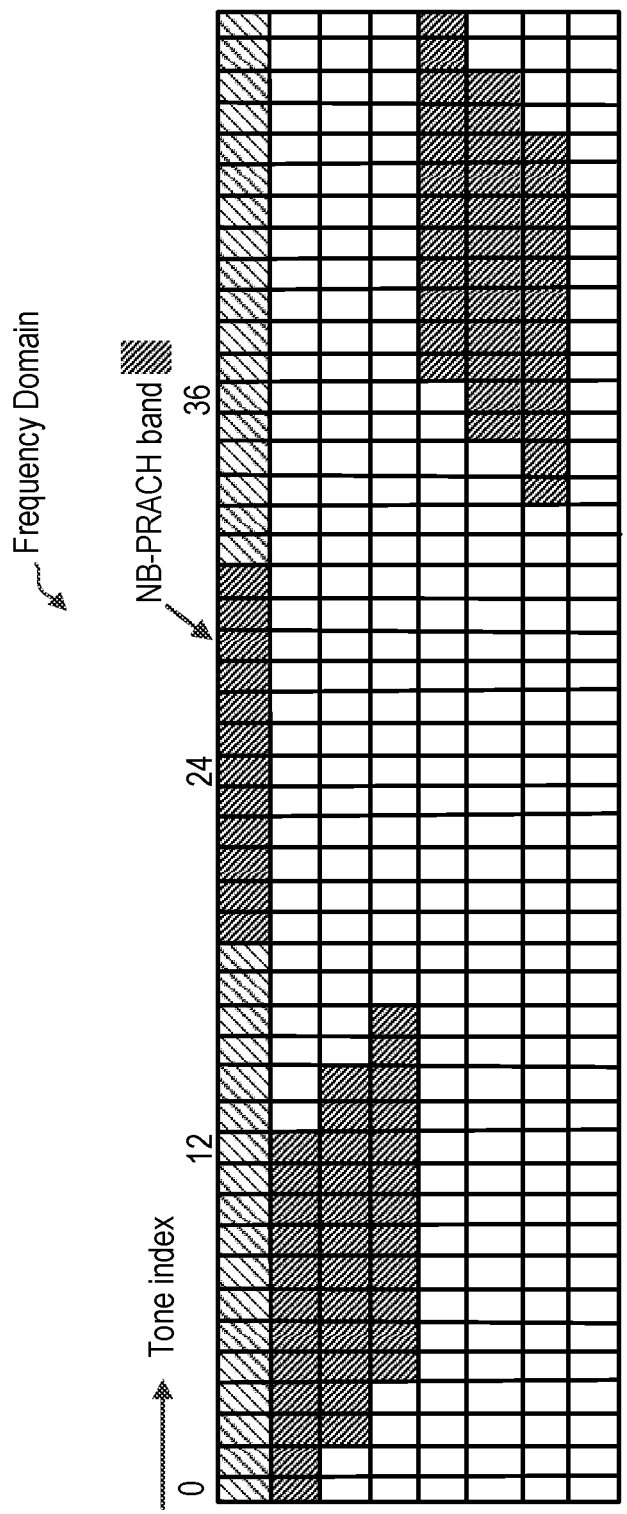
FIG. 12 is a block diagram of several examples of NPRACH band positions that for NB-IoT in accordance with the principles of the disclosure.

FIG. 12 illustrates a block diagram of several examples of NPRACH band positions that for NB-IoT. For example, network node 12 can configure the NPRACH band towards the middle of the frequency grid, at the edge with 0, 2, or 4 guard tones. For example, the band locations illustrated in FIG. 12 start at tone index 0, 2, 4, 18, 32, 34 and 36. In one or more embodiment, the starting locations for the NPRACH band are 0, 2, 18, 34 and 36 such as to also correspond to starting points for transmission of random access preambles. In one or more embodiments, other number of band locations are configured. These configurations can be signaled using a System Information Block (SIB), or a Master Information Block (MIB), or the combination of MIB and SIB. In one or more embodiments, 2 bits in SIB2 is used to configure the number of NPRACH bands. In one or more embodiments, 3 bits in SIB2 is used to configure the position of each NPRACH band in frequency.

In one or more embodiment, some of these configurations may be fixed and thus do not need to be signaled. In one or more embodiments, for 3GPP, three different coverage classes may be configured for NPRACH. If the network only configures one NPRACH band, then wireless devices 10 of different coverage class will perform random access in the configured NPRACH band (but at different time resources).

If multiple NPRACH bands are configured, random access opportunities for one coverage class within one NPRACH band may be restricted thereby making it easier to avoid collision of NPRACH transmissions of different coverage classes. Therefore, in one or more embodiments, a coverage class index is mapped to a NPRACH band index. This can be achieved through specifying one or mapping methods as discussed herein. An example of the mapping method for mapping a coverage class index to a NPRACH band index is as follows:
  NPRACH band index for Coverage j=argmin_{i} (|Coverage j−NPRACH band i|)
  One NPRACH band (i=1): Coverage indices {1,2, 3}=>NPRACH band indices {1,1,1};
  Two NPRACH bands (i=1,2): Coverage indices {1,2, 3}=>NPRACH band indices {1, 2, 2}; and
  Three NPRACH bands (i=1,2,3): Coverage indices {1,2, 3}=>NPRACH band indices {1, 2, 3}.
In this example, with one NPRACH band, wireless devices 10 in all coverage classes use the same (and only)

NPRACH band. With two NPRACH bands, wireless devices 10 in enhanced coverage (coverage 2 and 3) use a different NPRACH band than wireless devices 10 in basic coverage (coverage 1). This avoids the random access opportunities of basic coverage being blocked by enhanced coverage classes that may require large number of repetitions. In one or more embodiments, the above specified mapping is implicitly carried out at wireless device 10. Another way of mapping coverage class to NPRACH band is to use radio resource control (RRC) signaling, e.g., SIB2, to signal the NPRACH band used by each coverage class. From this explicit signaling, wireless devices 10 in each coverage class know which PRACH band to use. Therefore, if configuring multiple NPRACH bands is allowed, a mapping method may be specified that maps coverage class to NPRACH band. In one embodiment, implicit mapping is carried out at wireless device 10 based on a formula. In another embodiment, mapping is carried out by explicit RRC signaling by the networks, where RRC signaling is wireless device 10 specific.

In one or more embodiments, time separation of PRACH of different coverage classes is as follows: range for the RRC parameter for PRACH starting subframe periodicity (expressed in terms of PRACH opportunities) is prachStartingSubframe={2, 4, 8, 16, 32, 64, 128, 256}; and an offset (expressed in terms of PRACH opportunities) is N*prachStartingSubframe+numRepetitionPerPreambleAttempt, where N={0, ... }.

The above described configurations for NPRACH are in the frequency domain. Below is discussed the time domain configuration for NPRACH. In one or more embodiments, the design in legacy LTE (i.e., Table 5.7.1-2 for FDD in 3GPP TS 36.211) can be modified as discussed herein. Table 1 illustrates basic formats for NPRACH in the time domain. In one or more embodiments, there are two CP lengths for NPRACH. Based on the agreements on NPRACH hopping pattern, four symbol groups and/or eight symbol groups are used for NPRACH basic units. These basic formats are illustrated in Table 1.

TABLE 1

NPRACH basic formats

| CP length | 4 symbol groups (w/o guard period in the end) | 8 symbol groups (w/o guard period in the end) | 4 symbol groups (w/guard period in the end) | 8 symbol groups (w/guard period in the end) |
|---|---|---|---|---|
| 266.7 us CP | 6.4 ms | 12.8 ms | 7 ms | 14 ms |
| 66.7 us CP | 5.6 ms | 11.2 ms | 6 ms | 12 ms |

With the above example of NPRACH basic formats defined, Table 5.7.1-2 of 3GPP TS 36.211 may be redesigned for NPRACH configuration design. The number of NPRACH repetitions for coverage enhancement is defined over the unit of an NPRACH basic format, i.e., by how many times a NPRACH basic format is repeated. Redesign is implemented for Table 5.7.1-2 in 3GPP TS 36.211 for NPRACH because the basic formats of NPRACH are much longer than LTE PRACH basic formats. In Table 1, associating with the 2 different CP lengths, 4 symbol groups and 8 symbol groups may be used as the basic formats of NPRACH. The NPRACH may last 7 ms for 4 symbol groups and 14 ms for 8 symbol groups. These lengths are much longer than the durations of 1 ms and 2 ms in LTE PRACH.

Therefore, the Table 5.7.1-2 in 3GPP TS 36.211 can be redesigned by enlarging the time resource units. For example, in one or more embodiments, the time units are expanded, for example, by 6.4 times, and then specify the valid PRACH starting times within every 64 subframes. The period of 64 subframes balances NPRACH delay, PUSCH scheduling flexibility, and the system frame number period (10.24 s) is divisible by 64 ms.

After enlarging the time resource unit from 10 ms (LTE PRACH) to 64 ms (NPRACH), a table similar to Table 5.7.1-2 in 3GPP TS 36.211 is constructed that specifies the valid starting times for NPRACH. An example of such table is given in Table 2.

TABLE 2

NPRACH random access configuration

| NPRACH Configuration Index | Number of symbol groups | floor( (System frame number * 10 + SF number)/64 ) | (System frame number * 10 + SF number) mod 64 |
|---|---|---|---|
| 0 | 4 | Even | 1 |
| 1 | 4 | Even | 25 |
| 2 | 4 | Even | 49 |
| 3 | 4 | Any | 1 |
| 4 | 4 | Any | 25 |
| 5 | 4 | Any | 49 |
| 6 | 4 | Any | 1, 33 |
| 7 | 4 | Any | 9, 41 |
| 8 | 4 | Any | 17, 49 |
| 9 | 4 | Any | 1, 17, 33 |
| 10 | 4 | Any | 9, 25, 41 |
| 11 | 4 | Any | 17, 33, 49 |
| 12 | 4 | Any | 1, 17, 33, 49 |
| 13 | 4 | Any | 9, 25, 41, 57 |
| 14 | 4 | Any | 1, 9, 17, 25, 33, 41, 49, 57 |
| 15 | 4 | Even | 57 |
| 16 | 8 | Even | 1 |
| 17 | 8 | Even | 25 |
| 18 | 8 | Even | 49 |
| 19 | 8 | Any | 1 |
| 20 | 8 | Any | 25 |
| 21 | 8 | Any | 49 |

TABLE 2-continued

NPRACH random access configuration

| NPRACH Configuration Index | Number of symbol groups | floor( (System frame number * 10 + SF number)/64 ) | (System frame number * 10 + SF number) mod 64 |
|---|---|---|---|
| 22 | 8 | Any | 1, 33 |
| 23 | 8 | Any | 9, 41 |
| 24 | 8 | Any | 17, 49 |
| 25 | 8 | Any | 1, 17, 33 |
| 26 | 8 | Any | 9, 25, 41 |
| 27 | 8 | Any | 17, 33, 49 |
| 28 | 8 | Any | 1, 17, 33, 49 |
| 29 | 8 | Any | 9, 25, 41, 57 |

TABLE 2-continued

NPRACH random access configuration

| NPRACH Configuration Index | Number of symbol groups | floor( (System frame number * 10 + SF number)/64 ) | (System frame number * 10 + SF number) mod 64 |
|---|---|---|---|
| 30 | N/A | N/A | N/A |
| 31 | 8 | Even | 57 |

For example, in one or more embodiments, with configuration 0 in Table 2, there is only one PRACH opportunity every 128 ms, while with configuration 14 in Table 2, there are sixteen PRACH opportunities every 128 ms. In one example, considering configuration 14 in Table 2, there are 16 opportunities every 128 ms with three different coverage classes.

For coverage class 1, 4 symbol groups are used (i.e., no repetition) and can be transmitted completely using one NPRACH opportunity.

For coverage class 2, 8 symbol groups are used (i.e., 2 repetitions with respect to the basic 4 symbol groups) and can be transmitted using 2 opportunities.

For coverage class 3, 32 symbol groups are used (i.e., 8 repetitions with respect to the basic 4 symbol groups) and can be transmitted using 8 opportunities.

The gap between any two starting subframes under any particular configuration index from 0 to 15 in Table 2 is a multiple of 8 ms. This gap ensures 4 symbol groups (whether the CP is 266.7 us or 66.7 us) can be fit in any two adjacent NPRACH opportunities, and also provides for narrowband physical uplink shared channel (NPUSCH) scheduling (whose scheduling units are a power-of-2 ms). In one or more embodiments, 4 and/or 8 symbol groups are used to construct NPRACH basic formats described herein, where NPRACH repetition defines how many times the NPRACH basic format is repeated as described herein.

Also, the gap between any two starting subframes under any particular configuration index from 16 to 31 in Table 2 is a multiple of 16 ms. This gap ensures 8 symbol groups (whether the CP is 266.7 us or 66.7 us) can be fit in any two adjacent NPRACH opportunities, and also provides for NPUSCH scheduling (whose scheduling units are a power-of-2 ms).

In one or more embodiments, the configurations in Table 2 are signaled to wireless device 10 using a field in a System Information Block (SIB), or a Master Information Block (MIB), or the combination of MIB and SIB. For example, SIB2 may have a field called "prach-ConfigIndex" that specified which row to use in Table 2. In one or more embodiments, two bits in SIB2 are used to configure a number of NPRACH bands. In one or more embodiments, three bits in SIB2 are used to configure a position of each NPRACH band in frequency.

Further, in one or more embodiments, the example of Table 2 does not specify which CP length to use for NPRACH. To signal the CP length for NPRACH, any one of two example alternative embodiments may be used:

Alternative embodiment one: One separate bit in system information (e.g., SIB2) is used to signal NPRACH CP length.

Alternative embodiment two: Table 2 can be doubled to accommodate two different CP lengths, and the prach-ConfigIndex jointly indicates CP length and other configuration information.

In one or more embodiments, to specify valid NPRACH starting times, PRACH configuration indices are defined over time period of 64 ms. Thus, some embodiments provide a design framework for RACH configuration in NB-IoT. This design framework supports flexible configuration of time and frequency resources for NPRACH opportunities of different coverage classes. In particular, the design provides several features.

Definition of basic NPRACH formats for RACH configuration;

Definition of NPRACH band concept for RACH configuration;

Flexible configuration of 1 or more NPRACH bands in frequency domain signaled via system information;

Implicit or explicit mapping from coverage classes to NPRACH bands; and/or

Built on NPRACH basic formats, a table design in physical layer specifying supported RACH resource configuration in time domain.

Figure 13:
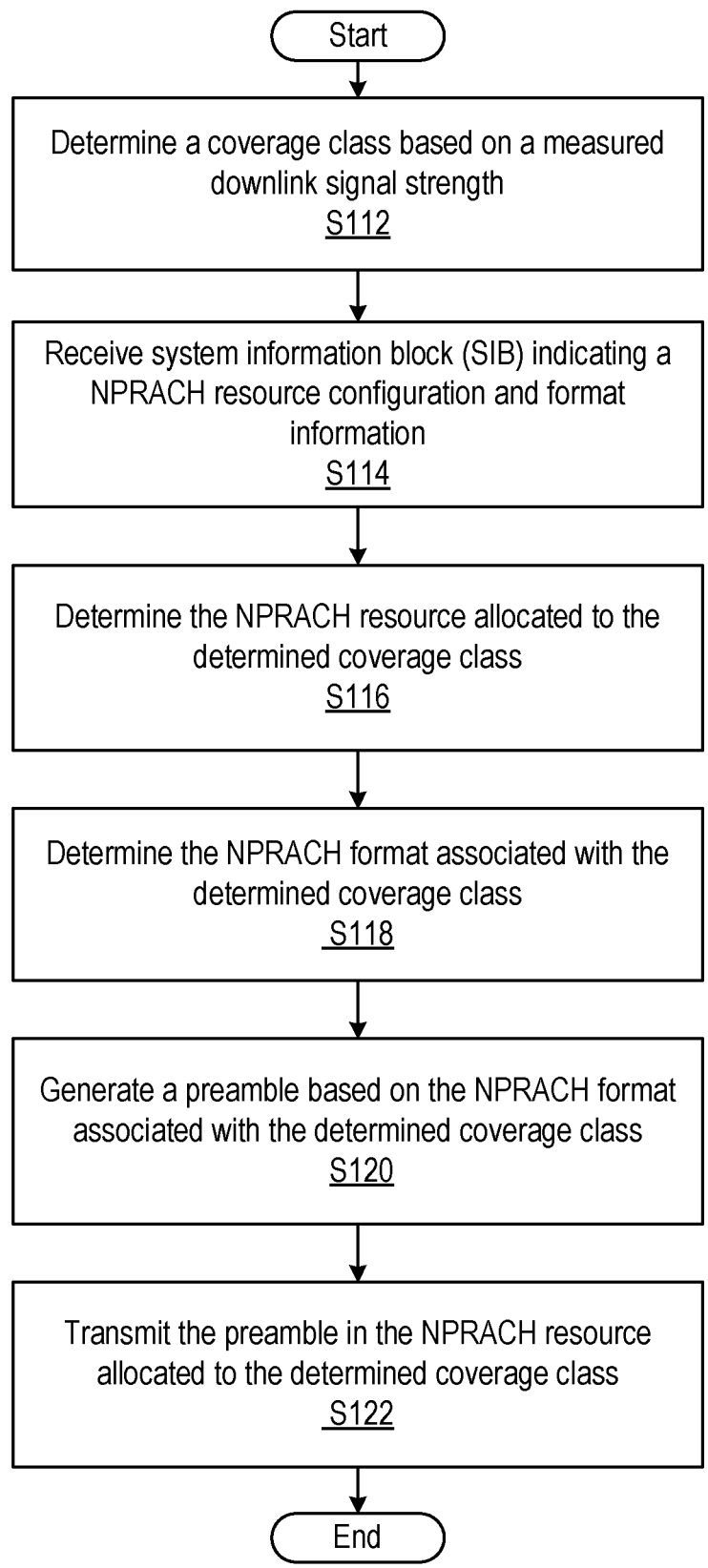
FIG. 13 is a flow diagram of an alternative embodiment of the indication process of indication code in accordance with the principles of the disclosure.

FIG. 13 illustrates a flow diagram of an alternative embodiment of the determination process of determination code 22 in accordance with the principles of the disclosure. A plurality of different coverage classes, e.g., three coverage classes, may be configured for NPRACH. If multiple NPRACH bands are configured, it is desirable to restrict random access opportunities for one coverage class within one NPRACH band, thereby making it easier to avoid collision of NPRACH transmissions of different coverage classes, as described herein. However, if only one NPRACH band is configured, then wireless devices 10 of different coverage classes will perform random access in the configured NPRACH band but at different time resources, as described herein.

Processing circuitry 16 is configured to determine a coverage class based on a measured downlink signal strength (Block S112). In one or more embodiments, the downlink signal strength is measured by wireless device 10. Processing circuitry 16 is configured to receive system information block (SIB) indicating a NPRACH resource configuration and format information as described herein (Block S114). Processing circuitry 16 is configured to determine the NPRACH resource allocated to the determined coverage class as described herein (Block S116). Processing circuitry 16 is configured to determine the NPRACH format associated with the determined coverage class as described herein (Block S118).

Processing circuitry 16 is configured to generate a preamble based on the NPRACH format associated with the determined coverage class as described herein (Block S120). Processing circuitry 16 is configured to transmit the preamble in the NPRACH resource allocated to the determined coverage class as described herein (Block S122). In one or more embodiments, Blocks S112 and S114 occur in reverse order or at substantially the same time. In one or more embodiments, Blocks S116 and S118 occur in reverse order or at substantially the same time.

Figure 14:
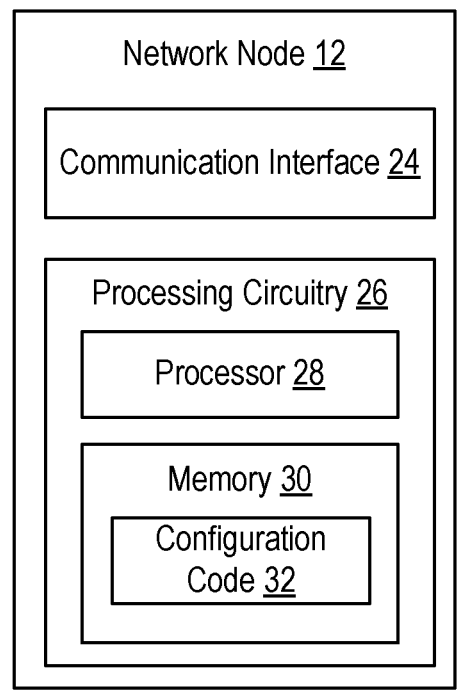
FIG. 14 is a block diagram of an exemplary network node configured to configure wireless device to transmit a random access preamble for communication in a communication network in accordance with the principles of the disclosure.

FIG. 14 illustrates is a block diagram of a network node 12 configured to configure wireless device 10 to transmit a random access preamble for communication in a communication network. Node 12 can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. Network node 12 includes communication interface 24 for communicating with wireless device 10 via one or more communication protocols via one or more networks. Network node 12 includes processing circuitry 26. Processing circuitry 26 includes processor 28 and memory 30. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 28 may be configured to access (e.g., write to and/or reading from) memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by processor 28 and/or other data, e.g., data pertaining to communication, e.g., configuration and/or address data of nodes, etc.

Processing circuitry 26 may be configured to control any of the methods and/or processes described herein and/or to cause such methods and/or processes to be performed, e.g., by network node 12. Corresponding instructions may be stored in the memory 30, which may be readable and/or readably connected to processor 28. Processor 28 corresponds to one or more processors for performing network node 12 functions described herein. Network node 12 includes memory 30 that is configured to store data, programmatic software code and/or other information described herein. Memory 30 is configured to store configuration code 32. For example, configuration code 32 includes instructions that, when executed by processor 28, causes processor 28 to perform the process discussed in detail with respect to FIG. 15. In one or more embodiments, functions described herein with respect to node 12 are performed in a distributed manner among several nodes 12 such as in a network cloud.

Figure 15:
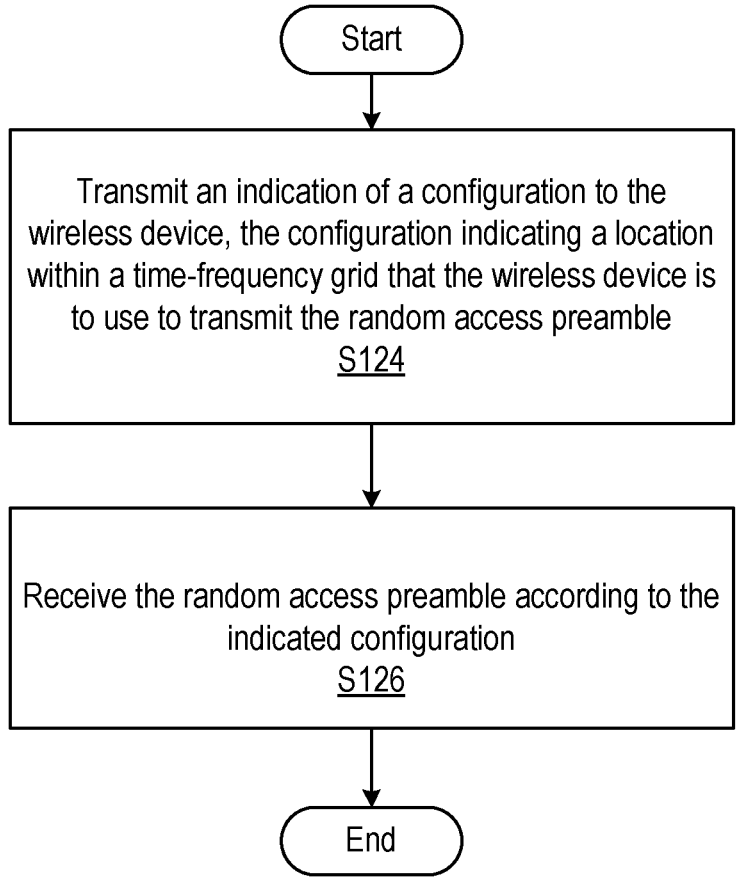
FIG. 15 is a flow diagram of an exemplary configuration process of configuration code in accordance with the principles of the disclosure.

FIG. 15 illustrates an exemplary flow diagram of a configuration process of configuration code 32 in accordance with the principles of the disclosure. Processing circuitry 26 is configured to transmit an indication of a configuration to wireless device 10 (Block S124). In one or more embodiments, the configuration indicates a location within a time-frequency grid that wireless device 10 is to use to transmit the random access preamble (Block S124). In one or more embodiments, the configuration indicates a location within a time-frequency grid that the wireless device is to use to transmit the random access preamble. In one or more embodiments, the location within a time-frequency grid corresponds to a time domain location and frequency domain location. In one or more embodiments, the location within a time-frequency grid is the starting point in the time domain and in the frequency domain for transmission of the random access preamble. Processing circuitry 26 is configured to receive the random access preamble according to the indicated configuration as described herein (Block S126).

Figure 16:
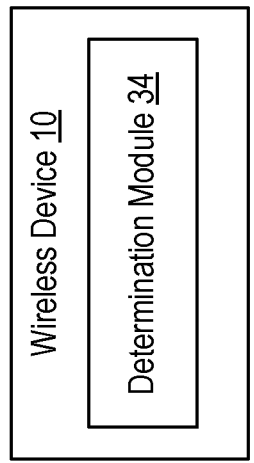
FIG. 16 is a block diagram of an alternative embodiment of wireless device in accordance with the principles of the disclosure.
Figure 17:
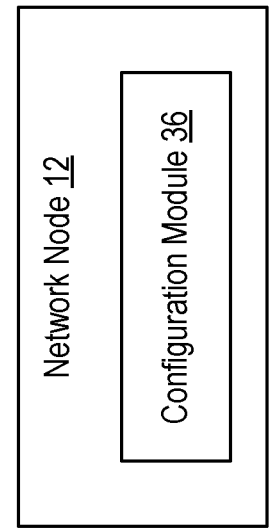
FIG. 17 is a block diagram of an alternative embodiment of network node in accordance with the principles of the disclosure.

FIG. 16 illustrates is a block diagram of an alternative embodiment of wireless device 10 in accordance with the principles of the disclosure. Wireless device 10 includes determination module 34 that is configured to perform the determination process as described above with respect determination code 22. The signal indicating the RACH frequency band and the tone index for NB-IoT may be broadcast to a plurality of wireless devices, or unicast to a particular wireless device 10. FIG. 17 is a block diagram of an alternative embodiment of network node 12 in accordance with the principles of the disclosure. Network node 12 includes configuration module 36 that is configured to perform the configuration process as descried above with respect to configuration code 32.

Abbreviations

RACH Random Access Channel
PRACH Physical Random Access Channel
NPRACH Narrow-band Internet of Things Physical Random Access Channel
PA Power amplifier
PAPR Peak-to-average power ratio
IoT Internet of Things
MTC Machine-type communication
MIB Master information block
OFDMA Orthogonal frequency-division multiple-access
OFDM Orthogonal frequency-division modulation
SC-FDMA Single-carrier frequency-division multiple-access
CP Cyclic prefix
SoC System-on-a-chip
NB IoT Narrow-band Internet of Things
NB-LTE Narrow-band LTE
UE User equipment
SIB System information block
TDM Time-division multiplexing
FDM Frequency-division multiplexing Embodiments include:

Embodiment 1

A wireless device configured to transmit a random access preamble for communication in a communication network, the wireless device comprising:
  processing circuitry including a memory and a processor;
  the memory configured to store a tone index; and
  the processor configured to:
    obtain an indication of a random access channel, RACH frequency band; and
    obtain a tone index indicative of a position of the RACH frequency band in a frequency domain, on which RACH frequency band the random access preamble is to be transmitted.

Embodiment 2

The wireless device of Embodiment 1, wherein the communication network includes a narrowband Internet of things, NB-IoT, communication network.

Embodiment 3

The wireless device of Embodiment 1, wherein the memory is configured to store a number of RACH bands.

Embodiment 4

The wireless device of Embodiment 1, wherein the processor is further configured to obtain a time subframe at which to transmit the random access preamble.

Embodiment 5

The wireless device of Embodiment 1, wherein the processor is further configured to concatenate a plurality of RACH symbol groups to form the random access preamble.

Embodiment 6

A wireless device configured to transmit a random access preamble for communication in a communication network, the wireless device comprising:
  a memory module configured to store a tone index; and
  an RACH band determiner module configured to receive an indication of a random access channel, RACH frequency band; and
  a tone index determiner module configured to receive a tone index indicative of a position of the RACH frequency band in a frequency domain, on which RACH frequency band the random access preamble is to be transmitted.

Embodiment 7

A network node configured to configure a wireless device to transmit a random access preamble for communication in a communication network, the network node comprising:
  processing circuitry including a memory and a processor;
  the memory configured to store a tone index; and
  the processor configured to:
    generate a random access channel, RACH band; and
    generate a tone index indicative of a position in a frequency domain of the RACH band on which the random access preamble is to be transmitted by the wireless device.

Embodiment 8

A wireless device configured to transmit a random access preamble, the wireless device comprising:
  processing circuitry the processing circuitry configured to obtain a tone index; and
  determine a location within a frequency band for transmitting the random access preamble based on the obtained tone index.

Embodiment 9

The wireless device of Embodiment 8, wherein the tone index is in a range from 0 to 36, the tone index being based on a system bandwidth, a number of tones per random access channel, RACH, band, and a number of RACH bands.

Embodiment 10

The wireless device of Embodiment 8, wherein the tone index indicates a starting point within the frequency band for transmitting the random access preamble.

Embodiment 11

The wireless device of Embodiment 10, wherein the starting point is based on a bandwidth of a tone and the bandwidth of the transmission of the random access preamble is based on the number of tones per random access channel, RACH, band.

Embodiment 12

A network node configured to receive a random access preamble from a wireless device, the network node comprising:
  processing circuitry configured to:
  transmit an indication of a configuration to the wireless device, the configuration indicating a location within a time-frequency grid that the wireless device is to use to transmit the random access preamble; and
  receive the random access preamble at the location.

Embodiment 13

The network node of Embodiment 12, wherein the configuration is broadcast to a plurality of wireless devices.

Embodiment 14

The network node of Embodiment 12, wherein the location is indicated by at least one of a tone index and a subframe.

Embodiment 15

A method for transmitting a random access preamble for communication in a communication network, the method comprising:
  receiving an indication of a random access channel, RACH frequency band;
  receiving a tone index indicative of a position of the RACH frequency band in a frequency domain, on which RACH frequency band the random access preamble is to be transmitted; and
  transmitting the random access preamble.

Some embodiments advantageously provide wireless device 10, network node 12 and method for narrowband random access channel configuration.

According to one aspect of the disclosure, wireless device 10 is configured to transmit a random access preamble. Wireless device 10 includes processing circuitry 16. Processing circuitry 16 is configured to obtain a tone index, and determine a location within a frequency band for transmitting the random access preamble based on the obtained tone index.

According to one embodiment of this aspect, processing circuitry 16 is further configured to cause transmission of a random access preamble using the determined location within the frequency band. According to one embodiment of this aspect, the tone index indicates a starting point of a narrowband physical random access channel, NPRACH, within the frequency band for transmitting the random access preamble. According to one embodiment of this aspect, the obtaining of the tone index includes obtaining a plurality of tone indices. Each of the plurality of tone indices indicates a respective starting subcarrier of a narrowband physical random access channel, NPRACH, band within the frequency band. Processing circuitry 16 is further configured to determine a coverage class, and select one of the plurality of tone indices based on the determined coverage class.

According to one embodiment of this aspect, processing circuitry 16 is further configured to receive system information. The obtaining of the tone index is based on the received system information. According to one embodiment of this aspect, the system information is received via radio resource control (RRC) signaling. According to one embodiment of this aspect, the tone index ranges from 0 to 36.

According to one embodiment of this aspect, the tone index is based on at least one of system bandwidth, a number of tones per random access channel band and a number of random access channel bands.

According to one embodiment of this aspect, processing circuitry 16 is further configured to obtain at least a configuration index indicating at least one subframe at which the transmission of the random access preamble is to start. According to one embodiment of this aspect, the configuration index further indicates a cyclic prefix (CP) length. According to one embodiment of this aspect, the frequency band has a bandwidth of 180 kHz, the frequency band corresponding to a plurality of subcarriers.

According to another aspect of the disclosure, a method for wireless device 10 for transmitting a random access preamble is provided. A tone index is obtained (Block S108). A location within a frequency band for transmitting the random access preamble is determined based on the obtained tone index (Block S110).

According to one embodiment of this aspect, transmission of a random access preamble is caused using the determined location within the frequency band. According to one embodiment of this aspect, the tone index indicates a starting point of a narrowband physical random access channel, NPRACH, within the frequency band for transmitting the random access preamble. According to one embodiment of this aspect, the obtaining of the tone index includes obtaining a plurality of tone indices. Each of the plurality of tone indices indicates a respective starting subcarrier of a narrowband physical random access channel, NPRACH, band within the frequency band. A coverage class is determined. One of the plurality of tone indices is selected based on the determined coverage class.

According to one embodiment of this aspect, system information is received. The obtaining of the tone index is based on the received system information. According to one embodiment of this aspect, the system information is received via radio resource control (RRC) signaling. According to one embodiment of this aspect, the tone index ranges from 0 to 36.

According to one embodiment of this aspect, the tone index is based on at least one of system bandwidth, a number of tones per random access channel band and a number of random access channel bands. According to one embodiment of this aspect, at least a configuration index indicating at least one subframe at which the transmission of the random access preamble is to start is obtained. According to one embodiment of this aspect, the configuration index further indicates a cyclic prefix (CP) length. According to one embodiment of this aspect, the frequency band has a bandwidth of 180 kHz, the frequency band corresponding to a plurality of subcarriers.

According to another aspect of the disclosure, network node 12 configured to receive a random access preamble from wireless device 10 is provided. Network node 12 includes processing circuitry 26. Processing circuitry 26 is configured to transmit an indication of a configuration to wireless device 10, and receive the random access preamble according to the indicated configuration. The configuration indicates a location within a time-frequency grid that wireless device 10 is to use to transmit the random access preamble.

According to one embodiment of this aspect, the indication of the location within a time-frequency grid is based on a tone index. The indication of the location includes an indication of a location within a frequency band for starting transmission of the random access preamble. According to one embodiment of this aspect, the random access preamble corresponds to a frequency hopping random access preamble over a plurality of subcarriers. According to one embodiment of this aspect, the indication of the location within a time-frequency grid includes an indication of at least one subframe at which the transmission of the random access preamble is to start.

According to another aspect of the disclosure, a method for network node 12 for receiving a random access preamble from a wireless device is provided. An indication of a configuration is transmitted to wireless device 10. The configuration indicates a location within a time-frequency grid that wireless device 10 is to use to transmit the random access preamble (Block S124). The random access preamble according to the indicated configuration is received (Block S126).

According to one embodiment of this aspect, the indication of the location within a time-frequency grid is based on a tone index. The indication of the location includes an indication of a location within a frequency band for starting transmission of the random access preamble. According to one embodiment of this aspect, the random access preamble corresponds to a frequency hopping random access preamble over a plurality of subcarriers. According to one embodiment of this aspect, the indication of the location within a time-frequency grid includes an indication of at least one subframe at which the transmission of the random access preamble is to start.

According to another aspect of the disclosure, wireless device 10 is configured to transmit a random access preamble. Wireless device 10 includes determination module 34 configured to obtain a tone index, and determine a location within a frequency band for transmitting the random access preamble based on the obtained tone index.

According to another aspect of the disclosure, network node 12 configured to receive a random access preamble from wireless device 10. Network node 12 includes configuration module 36 configured to: transmit an indication of a configuration to wireless device 10. The configuration indicates a location within a time-frequency grid that wireless device 10 is to use to transmit the random access preamble. The configuration module is further configured to receive the random access preamble according to the indicated configuration.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A wireless device configured to transmit a random access preamble, the wireless device comprising:
   processing circuitry, the processing circuitry configured to:
   obtain at least one tone index of a plurality of tone indices, each tone index of the plurality of tone indices corresponding to a respective frequency location of a plurality of frequency locations within a time-frequency grid, each tone index of the plurality of tone indices indicating one starting subcarrier of one narrowband physical random access channel, NPRACH, band of a plurality of NPRACH bands within a frequency band, for each NPRACH band of the plurality of NPRACH bands, three bits in one system information block indicate one tone index, the obtained at least one tone index comprising a first tone index and a second tone index:
   the first tone index indicating a first starting subcarrier of a first NPRACH band within the frequency band, the first NPRACH band being associated with a first coverage class; and
   the second tone index indicating a second starting subcarrier of a second NPRACH band within the frequency band, the second NPRACH band being associated with a second coverage class, the first tone index and the second tone index ranging from 0 to 36;
   determine a coverage class;
   select one of the first tone index and the second tone index from the obtained at least one tone index based on the determined coverage class; and
   determine a location within the frequency band for transmitting the random access preamble based on the selected one of the first tone index and the second tone index.

2. The wireless device of claim 1, wherein the processing circuitry is further configured to cause transmission of the random access preamble using the determined location within the frequency band.

3. The wireless device of claim 1, wherein the processing circuitry is further configured to receive the one system information block; and the obtaining of the at least one tone index being based on the received one system information block.

4. The wireless device of claim 3, wherein the system information is received via radio resource control (RRC) signaling.

5. The wireless device of claim 1, wherein the at least one tone index is based on at least one of system bandwidth, a number of tones per random access channel band and a number of random access channel bands.

6. The wireless device of claim 1, wherein the processing circuitry is further configured to obtain at least a configuration index indicating at least one subframe at which the transmission of the random access preamble is to start.

7. The wireless device of claim 6, wherein the configuration index further indicates a cyclic prefix (CP) length.

8. The wireless device of claim 1, wherein the frequency band has a bandwidth of 180 kHz, the frequency band corresponding to a plurality of subcarriers.

9. A method for a wireless device for transmitting a random access preamble, the method comprising:
   obtaining at least one tone index of a plurality of tone indices, each tone index of the plurality of tone indices corresponding to a respective frequency location of a plurality of frequency locations within a time-frequency grid, each tone index of the plurality of tone indices indicating one starting subcarrier of one narrowband physical random access channel, NPRACH, band of a plurality of NPRACH bands within a frequency band, for each NPRACH band of the plurality of NPRACH bands, three bits in one system information block indicate one tone index, the obtained at least one tone index comprising a first tone index and a second tone index:
the first tone index indicating a first starting subcarrier of a first NPRACH band within the frequency band, the first NPRACH band being associated with a first coverage class; and
the second tone index indicating a second starting subcarrier of a second NPRACH band within the frequency band, the second NPRACH band being associated with a second coverage class, the first tone index and the second tone index ranging from 0 to 36;
determining a coverage class;
selecting one of the first tone index and the second tone index from the obtained at least one tone index based on the determined coverage class; and
determining a location within the frequency band for transmitting the random access preamble based on the selected one of the first tone index and the second tone index.

10. The method of claim 9, further comprising causing transmission of the random access preamble using the determined location within the frequency band.

11. The method of claim 9, further comprising receiving the one system information block; and the obtaining of the at least one tone index being based on the received one system information block.

12. The method of claim 11, wherein the system information is received via radio resource control (RRC) signaling.

13. The method of claim 9, wherein the at least one tone index is based on at least one of system bandwidth, a number of tones per random access channel band and a number of random access channel bands.

14. The method of claim 9, further comprising obtaining at least a configuration index indicating at least one subframe at which the transmission of the random access preamble is to start.

15. The method of claim 14, wherein the configuration index further indicates a cyclic prefix (CP) length.

16. The method of claim 9, wherein the frequency band has a bandwidth of 180 kHz, the frequency band corresponding to a plurality of subcarriers.

17. A network node configured to receive a random access preamble from a wireless device, the network node comprising:
processing circuitry, the processing circuitry configured to:
transmit an indication of at least one tone index of a plurality of tone indices to the wireless device, each tone index of the plurality of tone indices corresponding to a respective frequency location of a plurality of frequency locations within a time-frequency grid, each tone index of the plurality of tone indices indicating one starting subcarrier of one narrowband physical random access channel, NPRACH, band of a plurality of NPRACH bands within a frequency band, for each NPRACH band of the plurality of NPRACH bands, three bits in one system information block indicate one tone index, the transmitted at least one tone index comprising a first tone index and a second tone index:
the first tone index indicating a first starting subcarrier of a first NPRACH band within the frequency band, the first NPRACH band being associated with a first coverage class;
the second tone index indicating a second starting subcarrier of a second NPRACH band within the frequency band, the second NPRACH band being associated with a second coverage class, the first tone index and the second tone index ranging from 0 to 36; and
the at least one tone index indicating at least one location within the time-frequency grid associated with the random access preamble; and
receive the random access preamble on a location within the frequency band, the location corresponding to one of the first tone index and the second tone index comprised in the indicated at least one tone index and the one of the first tone index and the second tone index being based on a coverage class associated with the wireless device.

18. The network node of claim 17, wherein the random access preamble corresponds to a frequency hopping random access preamble over a plurality of subcarriers.

19. The method of claim 17, wherein the indication of the location within the time-frequency grid includes an indication of at least one subframe at which the transmission of the random access preamble is to start.

20. A method for a network node for receiving a random access preamble from a wireless device, the method comprising:
transmitting an indication of at least one tone index of a plurality of tone indices to the wireless device, each tone index of the plurality of tone indices corresponding to a respective frequency location of a plurality of frequency locations within a time-frequency grid, each tone index of the plurality of tone indices indicating one starting subcarrier of one narrowband physical random access channel, NPRACH, band of a plurality of NPRACH bands within a frequency band, for each NPRACH band of the plurality of NPRACH bands, three bits in one system information block indicate one tone index, the transmitted at least one tone index comprising a first tone index and a second tone index:
the first tone index indicating a first starting subcarrier of a first NPRACH band within the frequency band, the first NPRACH band being associated with a first coverage class;
the second tone index indicating a second starting subcarrier of a second NPRACH band within the frequency band, the second NPRACH band being associated with a second coverage class, the first tone index and the second tone index ranging from 0 to 36; and
the at least one tone index indicating at least one location within the time-frequency grid associated with the random access preamble; and
receiving the random access preamble on a location within the frequency band, the location corresponding to one of the first tone index and the second tone index comprised in the indicated at least one tone index and the one of the first tone index and the second tone index being based on a coverage class associated with the wireless device.

21. The method of claim 20, wherein the indication of the location includes an indication of the location within the frequency band for starting transmission of the random access preamble.

22. The method of claim 20, wherein the random access preamble corresponds to a frequency hopping random access preamble over a plurality of subcarriers.

23. The method of claim 20, wherein the indication of the location within the time-frequency grid includes an indication of at least one subframe at which the transmission of the random access preamble is to start.

* * * * *